United States Patent Office 3,331,377
Patented July 18, 1967

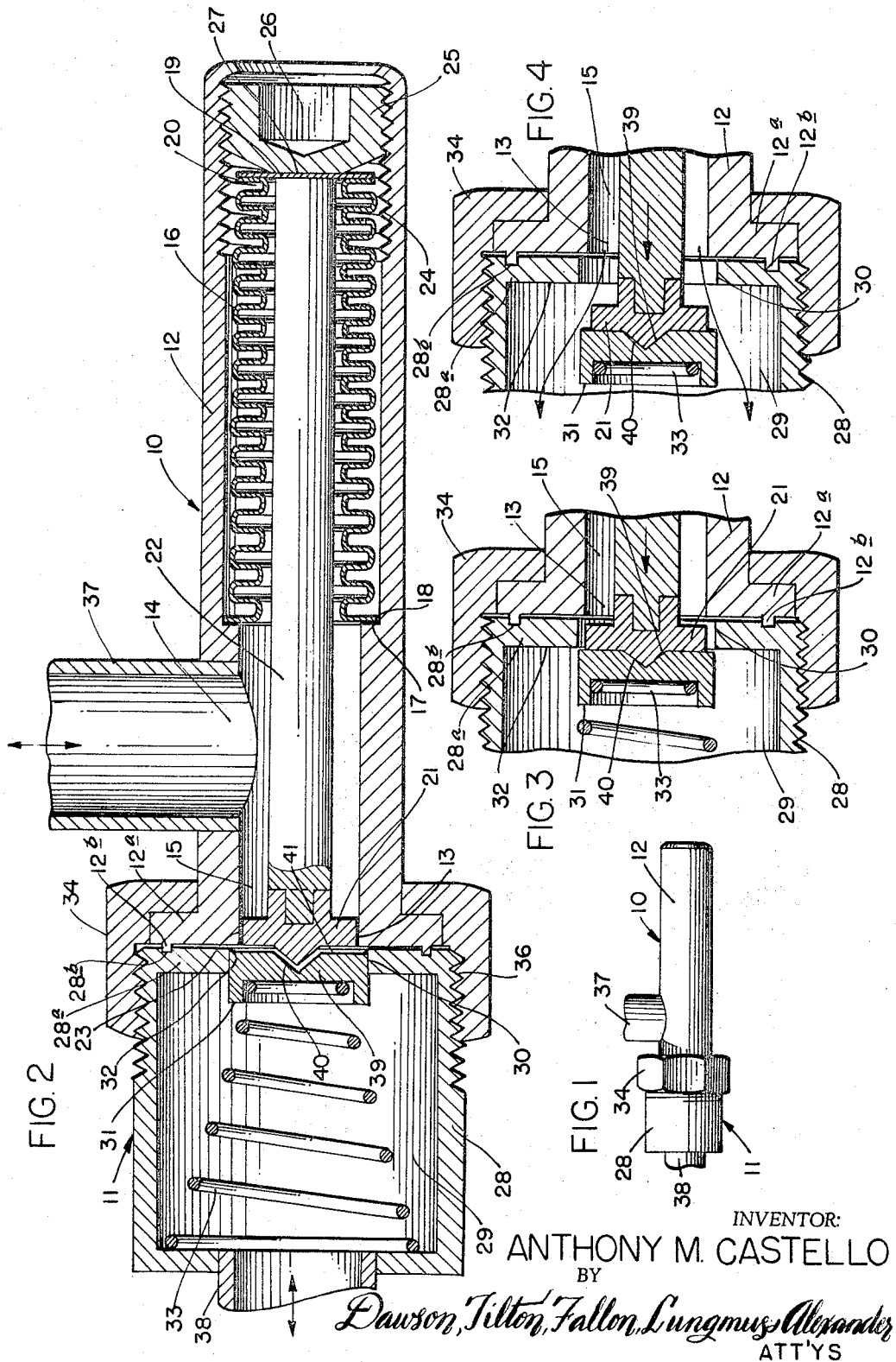

3,331,377
COUPLING DEVICE FOR CONNECTING PRECHARGED FLUID LINES
Anthony M. Castello, Wichita, Kans., assignor to The Coleman Company, Inc., Wichita, Kans., a corporation of Kansas
Filed June 28, 1963, Ser. No. 291,321
3 Claims. (Cl. 137—68)

This invention relates to a coupling device for connecting precharged fluid lines. The device has particular utility in connection with the installation of air conditioning systems.

In the installation of air conditioning systems it is frequently desirable to install the compressor and condenser section of the air conditioner at a considerable distance from the evaporator coil and fan section. The tubing used to provide the fluid connection for the transfer of the refrigerant fluid between these sections necessarily has a considerable internal volume. To avoid having to purge the connecting lines and charge them with refrigeration fluid during or after installation, it has become common practice to employ precharged lines which are temporarily sealed at both ends and are filled internally with the refrigerant fluid. These lines and the refrigeration system units to which they are attached must therefore be equipped with some means, such as valves or coupling devices, which permit the lines to be connected. In making these connections even a small loss of refrigerant can require recharging of the system, and therefore it is desirable to provide coupling devices which permit precharged fluid lines to be connected without loss of the fluid contained therein.

It is therefore an object of the present invention to provide a coupling device for connecting precharged fluid lines which maintains the lines in completely sealed condition before connection, and which can be connected without loss of the fluid. Further objects and advantages will be indicated in the following detailed specification.

The coupling device of this invention is shown in illustrative embodiment in the accompanying drawing, in which:

FIGURE 1 is a side elevational view of a coupling device incorporating the coupler member of the present invention;

FIGURE 2 is a side elevational view similar to FIGURE 1 showing the components of the coupling device in vertical section;

FIGURE 3 is an enlarged vertical sectional view of a portion of the coupling device illustrating the completion of the first stage in opening the valve elements of the device; and FIGURE 4 is an enlarged vertical sectional view similar to FIGURE 3 illustrating the completion of the final stage in the opening of the valve elements of the device.

This invention is particularly concerned with the coupler member designated generally by the number 10, which in the illustration given is adapted to cooperate with another coupler member designated generally by the number 11. The coupler member 10 comprises a tubular housing 12 which provides an axial port 13 in the forward end thereof, as shown more clearly in FIGURES 3 and 4, and a lateral port 14 which extends through the walls of housing 12. The lateral port 14 should be located intermediate the ends of housing 12. In the illustration given, port 14 is located in the forward end portion of the housing adjacent the axial port 13. Internally housing 12 provides a fluid flow passage 15 which extends between ports 14 and 13.

In accordance with the present invention, there is provided within the rearward portion of housing 12 a sealing means having a peripheral portion affixed to the wall of the housing and providing a transversely extending wall which is axially shiftable toward the forward end of the housing without disturbing the affixed peripheral portion. Such means can take various forms, but preferably an axially-compressible, fluid-tight bellows means, such as bellows 16, is employed. As shown in FIGURE 2, bellows 16 is disposed within the rearward end portion of housing 12 extending from a position adjacent lateral port 14 to a position adjacent the rear end of housing 12. The bellows may be formed of metal or other suitable material for providing a compressible fluid-tight bellows. In the illustration given, bellows 16 is formed of metal, and has its forward end rigidly affixed to an offset shoulder 17 within housing 12 by brazing, as indicated in FIGURE 2, the brazed connection being designated by the number 18. As will be noted, the interior of the bellows forms a sealed extension of fluid passage 15. The bellows 16 is provided with a closed rear end 19, which in the illustration given consists of a transversely extending disk securely affixed and sealed to the rear end of bellows 16 by a welded joint as indicated at 20.

A valve plug 21 is received within axial port 13. In the illustration given, valve plug 21 comprises an enlarged head rigidly affixed to an axially extending rod 22 which extends rearwardly until it contacts the rear end of bellows 16 comprising the transversely extending wall 19. Rod 22 serves as an actuating means for the valve 21 as will subsequently be described.

Frangible sealing means is provided for temporarily connecting and sealing the sides of valve plug 21 to the walls of housing 12. In the illustration given, this is accomplished by providing a soldered connection between the valve plug 21 and the portion of the housing wall surrounding port 13, as indicated by the number 23 in FIGURE 2. The soldered connection 23 should provide a hermetic seal while being subject to be easily broken when axial pressure is applied to the valve by means of rod 22.

The present invention also contemplates the provision of means disposed at the rear of housing 12 for applying axial pressure to the rear of bellows 16 and thereby to the rear end of actuating rod 22 for breaking plug 21 loose from the housing. Preferably, screw means is provided for accomplishing this function. In the illustration given, the housing rear end portion is provided with internal threads 24 which overlap the rear end of bellows 16 as shown in FIGURE 2. An actuating screw 25 is received within the rear end of housing 12 in threaded engagement therewith. In the illustration given, screw means 12 is in the form of an extrenally threaded plug which has a recess 26 in the rear end thereof providing a wrench socket. It will be understood that the shape and construction of screw means 25 can be varied considerably without departing from the basic principles of this invention. The forward end of screw plug 25 is provided with a flat face 27 which bears against the bellows rear wall 19 in alignment with the rear end of rod 22. With this construction, the advancing of screw 25 within housing 12 will exert axial pressure on wall 19 and thereby on the end of rod 22, which in turn will apply pressure to valve head 21 until the frangible connection 23 is broken. The valve head 21 will then move forwardly out of axial port 13 to a position, for example, as shown in FIGURE 3, and bellows 16 will be compressed sufficiently to permit this movement.

For cooperating with coupler 10, there is shown a coupler 11 which includes a housing 28 providing an internal flow passage 29 communicating with an axial port 30 at the forward end thereof. A cup-shaped valve member 31 is received within port 30 and is temporarily sealed thereto by a soldered connection as indicated at 32 in FIGURES 2 and 3. The soldered connection 32 may be similar in construction and operation to the connection 23 previously described.

A compression spring 33 is disposed within fluid passage 29 having its forward end received within the rearwardly extending cup of valve 31 and its rearward end supported on an offset shoulder at the rear of space 29.

To form a mechanical connection between the coupler members 10 and 11, there is provided a clamping ring 34 which is internally threaded for cooperation with the threaded end portion of housing 28. In the illustration given, the forward end of housing 12 is provided with an outwardly extending flange 12a for retaining clamping ring 34 on housing 12 while permitting the clamping ring to rotate with respect to the housing. Housing 28 provides an inwardly extending flange 28a for cooperating with flange 12a. These flanges respectively provide an annular recess 28b and a sealing ring 12b which is received in the recess. If desired a Teflon gasket can be seated within recess 28b or substituted for ring 12b. As shown in FIGURE 2, clamping ring 34 can be run onto housing 11 until the forward face of shoulder abuts the forward face of inwardly extending shoulder 36 provided by housing 28, and ring 12b sealingly engages the bottom of recess 28b.

*Operation*

As previously described, the position of the parts in the first stage of connecting the coupler members 10 and 11 is shown in FIGURE 2. In this position, the clamping ring 34 has been tightened on housing 28 until a tight sealed connection is formed between the forward faces of the couplers 10 and 11. It will be understood that the space within coupler 10, such as the fluid passage 15, is in open communication with a fluid charged line. For example, space 15 can communicate with a line containing a refrigeration fluid which communicates with lateral port 14 through a sleeve connector 37, which in turn is connected to a precharged fluid line (not shown). Similarly, the fluid space 29 within housing 28 is connected by means of a sleeve 38 to a precharged fluid line. At the time the couplers are connected, therefore, the spaces within housings 12 and 28 will be filled with a refrigerant fluid which will usually be in gaseous form.

After the couplers 10 and 11 have been securely clamped together as described above, a wrench is applied to the socket 26 in the screw plug 25 and the screw is turned in a direction to apply axial pressure to the rear of the bellows 16 and thereby to actuating rod 22. In this application the pressure is continued until the soldered connection 23 is broken. When the coupler 10 is used in combination with a coupler, such as the coupler 11 shown in the drawing, there is preferably provided a small clearance between the abutting faces of the valve plugs 21 and 31. Such a clearance is shown in FIGURE 2 at 41. This permits the soldered connection 23 to be broken before valve plug 21 sontacts valve plug 31.

The next stage in opening the fluid passage between the couplers is shown in FIGURE 3. Through the continued advance of screw plug 25 valve plug 21 is brought into contact with valve plug 31 as shown in FIGURE 3. To provide for a degree of lateral interlocking of these parts, the forward face of valve plug 21 can be provided with a central projection 39, and the forward face of valve plug 31 with a corresponding central depression 40. These parts will therefore engage as shown in FIGURE 3. By continuing the application of axial pressure to rod 22 the soldered connection 32 of the valve plug 31 will be broken, and the valve plug 31 will move out of port 30 by compressing spring 33.

The final position of the valve parts is shown in FIGURE 4 where both ports 13 and 30 are open to permit the flow of liquid or gas through the coupler members, thereby placing the fluid lines in communication with sleeves 37 and 38 in direct connection. After the connection is formed, it will usually not be necessary or desirable to disturb this part of the refrigeration system by disconnecting the couplers 10 and 11. Provision will be made for opening the lines elsewhere in the system. Valves 21 and 31 are therefore designed to function primarily as one time break-away valves.

While in the foregoing specification this invention has been described in relation to a specific preferred embodiment thereof and many details have been set forth for purpose of illustration, it will be apparent to those skilled in the art that the invention is susceptible to other embodiments and that many of the details described herein can be varied considerably without departing from the basic principles of the invention.

I claim:

1. In a coupling device for connecting precharged fluid lines, a first coupler member comprising a first tubular housing providing a first axial port in the forward end thereof and a lateral port intermediate its ends with an internal fluid flow passage extending between said ports, sealing means disposed within the rearward portion of said housing, said sealing means having a peripheral portion affixed to said housing and providing a transversely extending wall which is axially shiftable toward the forward end of said housing without disturbing said peripheral portion, a first valve plug received within said axial port, first frangible means sealingly securing said first valve plug to said first housing, actuating rod means axially disposed within said housing with the forward end thereof bearing against said valve plug and the rearward end thereof bearing against the transverse wall of said sealing means, screw means cooperating with the rearward portion or said housing for applying axial pressure to said transverse wall and thereby to said rod for breaking said first plug valve loose from said first housing by the forward movement of said wall and rod, a second coupler member comprising a second tubular housing providing a second axial port alignable with said first axial port, a second valve plug received within said second axial port, second frangible means sealingly securing said second valve plug to said second housing, said second valve plug being retractable within said second housing to open said second port when said second frangible means is broken, said first valve plug engaging said second valve plug to break said second valve plug loose from said second housing by the continued actuation of said screw means with said plugs movable to a position opening a fluid path through said axial ports, and connecting means for sealingly securing together the adjacent ends of said first and second coupler members with said first and second valve plugs in alignment.

2. The combination of claim 1 wherein said sealing means comprises an axially-compressible fluid-tight bellows, and wherein said first and second valve plugs are spaced apart before the breaking of the said first frangible means, whereby said first and second frangible means are broken separately.

3. In a coupling device for connecting precharged fluid lines, a first coupler member comprising a first tubular housing providing an axial port in the forward end thereof and a lateral port intermediate its ends with an internal fluid flow passage extending between said ports, axially-compressible fluid-tight bellows means received within the rearward end portion of said housing, said bellows means having an open forward end and a closed rear end, the forward end portion of said bellows means being sealingly attached around the periphery thereof to said housing so that the interior of said bellows means forms a sealed extension of said fluid passage, a first valve plug received wthin said axial port, first frangible means sealingly securing the side walls of said plug to said housing, a rod axially disposed within said housing with the forward end thereof affixed to said valve plug and having its rear end bearing against the rear end of said bellows, actuating means disposed within the rearward portion of said housing immediately beyond the rear of said bellows means for applying axial pressure to said bellows rear end and thereby to said rod for breaking said plug loose from said housing with the forward movement of said rod and the compression of said bellows, a second coupler member comprising a second tubular housing providing a second axial port alignable with said first axial port, a second valve plug received within said second axial port, second frangible means sealingly securing said second valve plug to said second housing, said second valve plug being retractable within said second housing to open said second port when said second frangible means is broken, said first valve plug engaging said second valve plug to break said second valve plug loose from said second housing by the continued actuation of said actuating means with said plugs movable to a position opening a fluid path through said axial ports, and connecting means for sealingly securing together the adjacent ends of said first and second coupler members with said first and second valve plugs in alignment, said first and second valve plugs being spaced apart before the breaking of said first frangible means, whereby said first and second frangible means are broken separately.

References Cited

UNITED STATES PATENTS

| | | | |
|---|---|---|---|
| 1,992,902 | 2/1935 | McIntosh | 251—335.2 X |
| 2,203,922 | 6/1940 | Paisley | 137—614.06 |
| 2,405,439 | 8/1946 | Lubbock et al. | 137—68 |
| 2,667,760 | 2/1954 | Curtis | 251—152 X |

WILLIAM F. O'DEA, *Primary Examiner.*

ISADOR WEIL, *Examiner.*

R. GERARD, *Assistant Examiner.*